US012230873B2

(12) United States Patent
Kim et al.

(10) Patent No.: US 12,230,873 B2
(45) Date of Patent: Feb. 18, 2025

(54) ANTENNA PACKAGE AND IMAGE DISPLAY DEVICE INCLUDING THE SAME

(71) Applicant: DONGWOO FINE-CHEM CO., LTD., Jeollabuk-do (KR)

(72) Inventors: Na Yeon Kim, Seoul (KR); Sung Hoe Kim, Seoul (KR); Dae Kyu Kim, Gyeonggi-do (KR); Byung Eun Jeon, Seoul (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 135 days.

(21) Appl. No.: 18/100,704

(22) Filed: Jan. 24, 2023

(65) Prior Publication Data

US 2023/0246330 A1 Aug. 3, 2023

(30) Foreign Application Priority Data

Jan. 28, 2022 (KR) ........................ 10-2022-0013331

(51) Int. Cl.

*H01Q 1/38* (2006.01)
*H01Q 1/24* (2006.01)
*H01Q 1/46* (2006.01)
*H01Q 1/50* (2006.01)
*H01Q 21/00* (2006.01)

(52) U.S. Cl.

CPC ............... *H01Q 1/38* (2013.01); *H01Q 1/243* (2013.01); *H01Q 1/46* (2013.01); *H01Q 1/50* (2013.01); *H01Q 21/0006* (2013.01)

(58) Field of Classification Search

CPC ............ H01Q 1/38; H01Q 1/243; H01Q 1/46; H01Q 1/50; H01Q 21/0006; H01Q 21/0075; H01Q 21/08; H01Q 1/2283; H01P 5/028; H04M 1/026

See application file for complete search history.

(56) References Cited

U.S. PATENT DOCUMENTS 11,088,443 B2 * 8/2021 Ryu ......................... H01Q 1/38
2022/0131279 A1 * 4/2022 Kim ....................... H01Q 1/243
2022/0190467 A1 * 6/2022 Kim ..................... H01Q 1/2291

FOREIGN PATENT DOCUMENTS

KR 10-2019-0009232 A 1/2019

* cited by examiner

*Primary Examiner* — Seung H Lee

(74) *Attorney, Agent, or Firm* — The PL Law Group, PLLC

(57) ABSTRACT

An antenna package includes an antenna device including an antenna dielectric layer and an antenna unit formed on the antenna dielectric layer, and an intermediate circuit board electrically connected to the antenna unit. The intermediate circuit board includes a core layer and a signal line formed on a surface of the core layer and electrically connected to the antenna unit. A width of one end portion of the signal line connected to the antenna unit is smaller than a width of the other end portion opposite to the one end portion of the signal line. Impedance mismatching is prevented by the construction of the signal line to improve antenna properties.

16 Claims, 9 Drawing Sheets

400

ANTENNA PACKAGE AND IMAGE DISPLAY DEVICE INCLUDING THE SAME

CROSS-REFERENCE TO RELATED APPLICATION AND CLAIM OF PRIORITY

This application claims the benefit under 35 USC § 119 of Korean Patent Application No. 10-2022-0013331 filed on Jan. 28, 2022 in the Korean Intellectual Property Office, the entire disclosures of which is incorporated herein by reference for all purposes.

BACKGROUND

1. Field

The present invention relates to an antenna package and an image display device including the same. More particularly, the present invention relates to an antenna package including an antenna device and a circuit board and an image display device including the same.

2. Description of the Related Art

As information technologies have been developed, a wireless communication technology such as Wi-Fi, Bluetooth, etc., is combined with an image display device in, e.g., a smartphone form. In this case, an antenna may be combined with the image display device to provide a communication function.

According to developments of a mobile communication technology, an antenna capable of implementing, e.g., high frequency or ultra-high frequency band communication is needed in the display device.

To increase sensitivity and gain of a radiator included in an antenna, the radiator may be disposed within a display area of a front portion of an image display device. In this case, a signal loss of an antenna operable in the high frequency or ultra-high frequency band may occur due to an insulating structure or a conductive structure of the image display device disposed at the front portion.

Further, when a feeding is performed to the antenna from an antenna driving integrated circuit disposed at a rear portion of the image display device, radiation properties and impedance set in the high frequency or ultra-high frequency band may be disturbed in a bonding region of a feeding circuit and the antenna.

Accordingly, antenna radiation properties in a desired high frequency or ultra-high frequency band may be disturbed or the antenna gain may be reduced.

SUMMARY

According to an aspect of the present invention, there is provided an antenna package having improved radiation property and electrical reliability.

According to an aspect of the present invention, there is provided an image display device including an antenna package with improved radiation property and electrical reliability.

(1) An antenna package, including: an antenna device including an antenna dielectric layer and an antenna unit formed on the antenna dielectric layer; and an intermediate circuit board electrically connected to the antenna unit, the intermediate circuit board including: a core layer; and a signal line formed on a surface of the core layer and electrically connected to the antenna unit, wherein a width of one end portion of the signal line connected to the antenna unit is smaller than a width of the other end portion opposite to the one end portion of the signal line.

(2) The antenna package of the above (1), wherein the signal line includes: a first port formed at the other end portion; a second port formed at the one end portion; and a modulating portion interposed between the first port and the second port, the modulating portion having a width different from each width of the first port and the second port.

(3) The antenna package of the above (2), wherein the modulating portion includes a first modulating portion and a second modulating portion, wherein the signal line further includes: a first wiring portion connecting the first port and the first modulating portion; a second wiring portion connecting the first modulating portion and the second modulating portion and including branched portion; and a third wiring portion connecting the second modulating portion and the second port and including signal output portions.

(4) The antenna package of the above (3), wherein the second modulating portion is connected to each of the branched portions, and a plurality of the signal output portions are branched from the second modulating portion.

(5) The antenna package of the above (4), wherein the second port includes a plurality of second ports connected to each of terminal ends of the signal output portions.

(6) The antenna package of the above (3), wherein a width of the second wiring portion is smaller than a width of the first wiring portion, and a width of the third wiring portion is smaller than the width of the second wiring portion.

(7) The antenna package of the above (6), wherein a width of the second modulating portion is greater than each width of the first wiring portion, the second wiring portion and the third wiring portion, and a width of the first modulating portion is greater than the width of the second modulating portion.

(8) The antenna package of the above (2), wherein the signal line further includes: a first wiring portion connecting the first port and the modulating portion and having a single line shape; and a second wiring portion connecting the modulating portion and the second port and having a single line shape.

(9) The antenna package of the above (8), wherein widths of the first wiring portion, the modulating portion and the second wiring portion sequentially decrease.

(10) The antenna package of the above (9), wherein the first port and the first wiring portion have the same width, and the second port and the second wiring portion have the same width.

(11) The antenna package of the above (2), wherein an impedance of the second port is greater than an impedance of the first port.

(12) The antenna package of the above (11), wherein an impedance of the modulating portion is different from an impedance of the first port and an impedance of the second port.

(13) The antenna package of the above (2), further including an antenna driving integrated circuit chip connected to the first port.

(14) The antenna package of the above (2), wherein the antenna unit includes a radiator, a transmission line extending from the radiator and a signal pad formed at an end portion of the transmission line, and the antenna package further includes a conductive bonding structure bonding the signal pad and the second port of the intermediate circuit board.

(15) The antenna package of the above (1), wherein the antenna device is an antenna-on display (AOD) device.

(16) An image display device, including: a display panel having a display area and a peripheral area; and the antenna package according to the above embodiments disposed on the display panel.

(17) The image display device of the above (16), further including a chip mounting board disposed under the display panel, wherein the antenna unit of the antenna package is disposed at least partially within the display area at a front portion of the image display device, and the intermediate circuit board of the antenna package is bent to a rear portion of the image display device and connected to the chip mounting board.

In an antenna package according to embodiments of the present invention, a signal line included in an intermediate circuit board connected to an antenna device may have a variable width. The signal line may include a modulating portion having a different width from that of a terminal portion, and thus impedances at both terminal portions of the signal line may be adjusted to be different from each other.

Thus, an impedance mismatching occurring in a bonding region of a signal pad of an antenna unit included in a antenna device may be reduced or suppressed. Therefore, radiation properties of the antenna unit in a high-frequency or ultra-high frequency band may be enhanced and a signal loss may be suppressed.

In some embodiments, the antenna package may include, e.g., an antenna device for an antenna-on display of 20 GHz or higher. Accordingly, antenna radiation properties in a high frequency or ultra-high frequency band in a range from, e.g., 30 GHz to 40 GHz may be implemented with high reliability.

DETAILED DESCRIPTION

According to embodiments of the present invention, an antenna package in which an antenna device and an intermediate circuit board are combined is provided. According to embodiments of the present invention, an image display device including the antenna package is also provided.

In exemplary embodiments, an antenna radiator of the antenna device may be disposed in a display area of the image display device. Accordingly, the antenna device of the antenna package may be provided as an antenna for AOD (Antenna-On Display).

In some embodiments, the antenna package may be fabricated in the form of a microstrip patch coupled with an antenna device. The antenna device or the antenna package may be applied to a mobile communication device operable in 3G, 4G, 5G or higher high-frequency or ultra-high frequency bands.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "first", "second", "upper", "lower", "top", "bottom", etc., as used herein do not designate absolute positions, but are intended to distinguish different components or relative positions.

Figure 1:
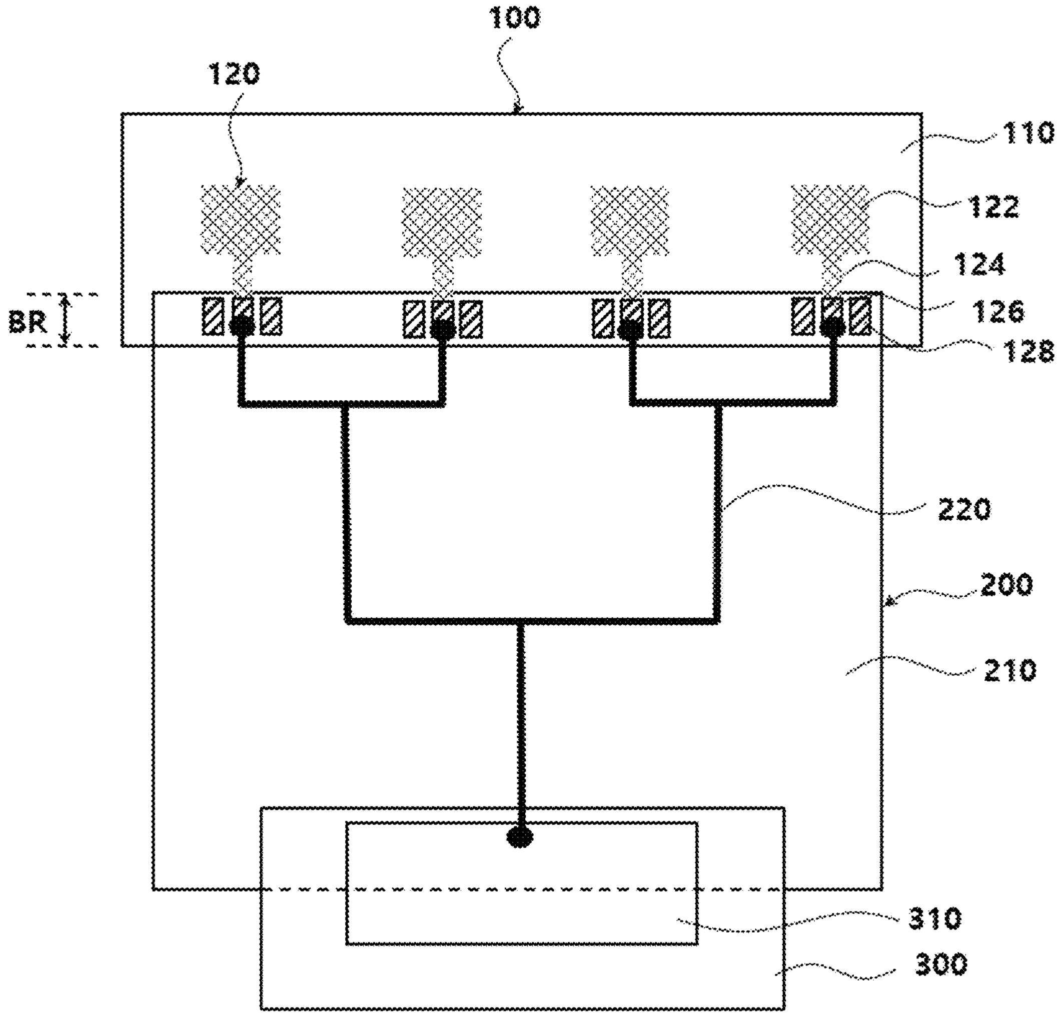
FIGS. 1 and 2 are schematic plan views illustrating antenna packages in accordance with exemplary embodiments.
Figure 2:
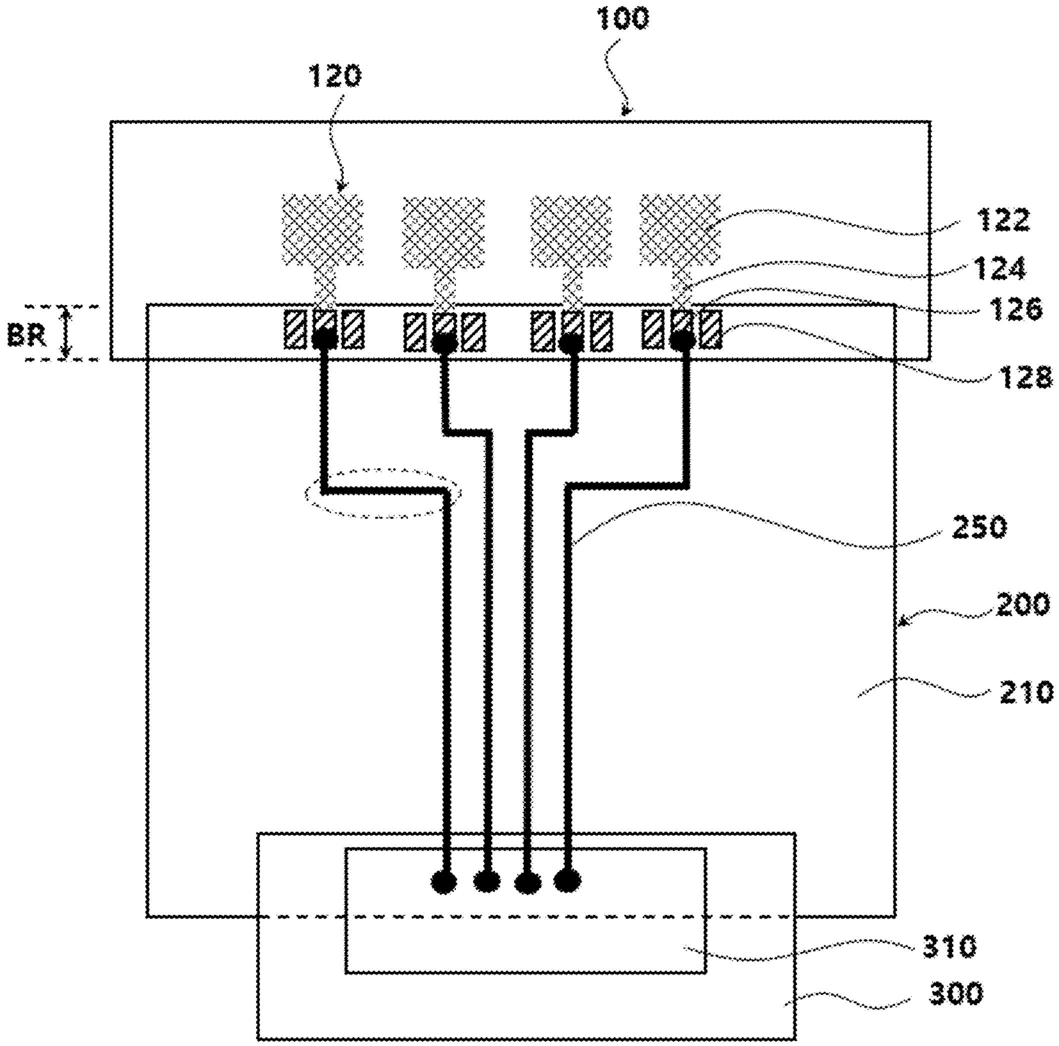

FIGS. 1 and 2 are schematic plan views illustrating antenna packages in accordance with exemplary embodiments.

Referring to FIG. 1, an antenna package includes an antenna device 100 and an intermediate circuit board 200.

The antenna device 100 may include an antenna dielectric layer 110 and an antenna unit 120 disposed on the antenna dielectric layer 110.

The antenna dielectric layer 110 may include a transparent resin film that may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more therefrom.

In some embodiments, an adhesive material such as an optically clear adhesive (OCA) or an optically clear resin (OCR) may be included in the antenna dielectric layer 110. In some embodiments, the antenna dielectric layer 110 may include an inorganic insulating material such as silicon oxide, silicon nitride, silicon oxynitride, glass, or the like.

In some embodiments, a dielectric constant of the antenna dielectric layer 110 may be adjusted in a range from about 1.5 to about 12. When the dielectric constant exceeds about 12, a driving frequency may be excessively decreased, so that driving in a desired high or ultra-high frequency band may not be implemented.

The antenna unit 120 may be formed on a top surface of the antenna dielectric layer 110. For example, a plurality of the antenna units 120 may be arranged in an array form along a width direction of the antenna dielectric layer 110 or the antenna package to form an antenna unit row.

The antenna unit 120 may include a radiator 122 and a transmission line 124.

The radiator 122 may have, e.g., a polygonal plate shape, and the transmission line 124 may extend from a side of the radiator 122. The transmission line 124 may be formed as a single member substantially integral with the radiator 122, and may have a width smaller than that of the radiator 122.

The antenna unit 120 may further include a signal pad 126. The signal pad 126 may be connected to one end portion of the transmission line 124. In an embodiment, the signal pad 126 may be formed as a member substantially integral with the transmission line 124, and an terminal end portion of the transmission line 124 may serve as the signal pad 126.

In some embodiments, a ground pad 128 may be disposed around the signal pad 126. For example, a pair of ground pads 128 may be disposed to face each other with the signal pad 126 interposed therebetween.

For example, the ground pad 128 may be electrically and physically separated from the transmission line 124 around the signal pad 126. The ground pad 128 may serve as a bonding pad to improve bonding stability with a conductive bonding structure 150 (see FIG. 7).

The antenna unit 120 or the radiator 122 may be operable in a signal transmission/reception corresponding to high frequency or ultra-high frequency band (e.g., 3G, 4G, 5G or higher band). For example, the resonance frequency of the antenna unit 120 or the radiator 122 may be about 10 GHz or more, from about 10 GHz to 40 GHz, preferably from 20 GHz to 40 GHz. In a non-limiting example, the resonance frequency of the antenna unit 120 may be about 28 GHz or more, about 35 GHz or more, or from 36 GHz to 40 GHz.

The antenna unit 120 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination thereof.

In an embodiment, the antenna unit 120 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna unit 120 may include a transparent conductive oxide such as indium tin oxide (ITO), indium zinc oxide (IZO), zinc oxide (ZnOx), indium zinc tin oxide (IZTO), etc.

In some embodiments, the antenna unit 120 may include a stacked structure of a transparent conductive oxide layer and a metal layer. For example, the antenna unit may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

The antenna unit 120 may include a blackened portion, so that a reflectance at a surface of the antenna unit 120 may be decreased to suppress a visual recognition of the antenna unit 120 due to a light reflectance.

In an embodiment, a surface of the metal layer included in the antenna unit 120 may be converted into a metal oxide or a metal sulfide to form a blackened layer. In an embodiment, a blackened layer such as a black material coating layer or a plating layer may be formed on the antenna unit 120 or the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

In some embodiments, the radiator 122 and the transmission line 124 may include a mesh-pattern structure to improve transmittance. In this case, a dummy mesh electrode (not illustrated) may be formed around the radiator 122 and the transmission line 124.

The signal pad 126 and the ground pad 128 may be formed as a solid pattern including the above-described metal or alloy in consideration of a feeding resistance reduction and a noise absorption efficiency. In an embodiment, at least a portion of the transmission line 124 may have a solid structure.

In some embodiments, an antenna ground layer 130 (see FIG. 7) may be formed on a bottom surface of the antenna dielectric layer 110. The antenna ground layer 130 may overlap the radiator 122 of the antenna unit 120 in a thickness direction. A substantially vertical radiation antenna may be implemented by generating an electric field or inductance between the radiator 122 and the antenna ground layer 130.

The antenna ground layer 130 may include the metal and/or the alloy described above. In some embodiments, the antenna ground layer 130 may be included as an independent element of the antenna device 100. In some embodiments, a conductive member of an image display device to which the antenna device 100 is applied may serve as the antenna ground layer 130.

The conductive member may include, e.g., various wirings such as a gate electrode, a scan line or a data line of a thin film transistor (TFT) included in a display panel, or various electrodes such as a pixel electrode and a common electrode.

In an embodiment, various structures including, e.g., a conductive material disposed under the display panel may serve as the antenna ground layer 130. For example, a metal plate (e.g., a stainless steel plate such as a SUS plate), a pressure sensor, a fingerprint sensor, an electromagnetic wave shielding layer, a heat dissipation sheet, a digitizer, etc., may serve as the antenna ground layer 130.

The intermediate circuit board 200 may be coupled to the antenna device 100 to be electrically connected to the antenna unit 120. In exemplary embodiments, the intermediate circuit board 200 may include a flexible printed circuit board (FPCB).

The intermediate circuit board 200 may include a signal line 220 formed on a surface of the core layer 210.

The core layer 210 may include, e.g., a flexible resin such as a polyimide resin, a modified polyimide (MPI), an epoxy resin, polyester, a cyclo olefin polymer (COP), or a liquid crystal polymer (LCP). The core layer 210 may include an internal insulating layer included in the circuit board 200.

One end portion of the signal line 220 may be electrically connected to the signal pad 126 of the antenna unit 120. For example, the signal pad 126 and the one end portion of the signal line 220 may be bonded to each other using the conductive bonding structure 150.

The other end portion of the signal line 220 may be electrically connected to an antenna driving integrated circuit (IC) chip 310. For example, the antenna driving integrated circuit (IC) chip 310 may be mounted on a chip mounting board 300.

In some embodiments, the chip mounting board 300 may be a rigid circuit board. In this case, the chip mounting board 300 may include an insulating layer having a higher rigidity than that of the core layer 210 included in the intermediate circuit board 200. For example, the chip mounting board 300 may include an insulating layer impregnated with a high-stiffness inorganic material such as glass fiber, and may include, e.g., a prepreg.

Feeding and driving signals may be transferred from the antenna driving integrated circuit chip 310 to the antenna unit 120 by the intermediate circuit board 200.

As illustrated in FIG. 1, a plurality of the antenna units 120 may be connected to one signal line 220 in an array form or a group form. For example, a plurality of the one end portions may be disposed to correspond to the other end portion of the signal line 220, and a passive type antenna device or antenna package may be provided.

Referring to FIG. 2, a signal line 250 may be individually and independently connected to each of the antenna units 120. Accordingly, an active type antenna device or antenna package in which the antenna units 120 are independently radiated and controlled may be provided.

For example, a plurality of the signal lines 250 may be electrically or physically spaced apart from each other and arranged on the core layer 210, and one end portions of the signal lines 250 may each be bonded to the signal pads 126 of the antenna units 120.

The other end portions of the signal lines 250 may be electrically connected to feeding pads included in the antenna driving integrated circuit chip 310.

Figure 3:
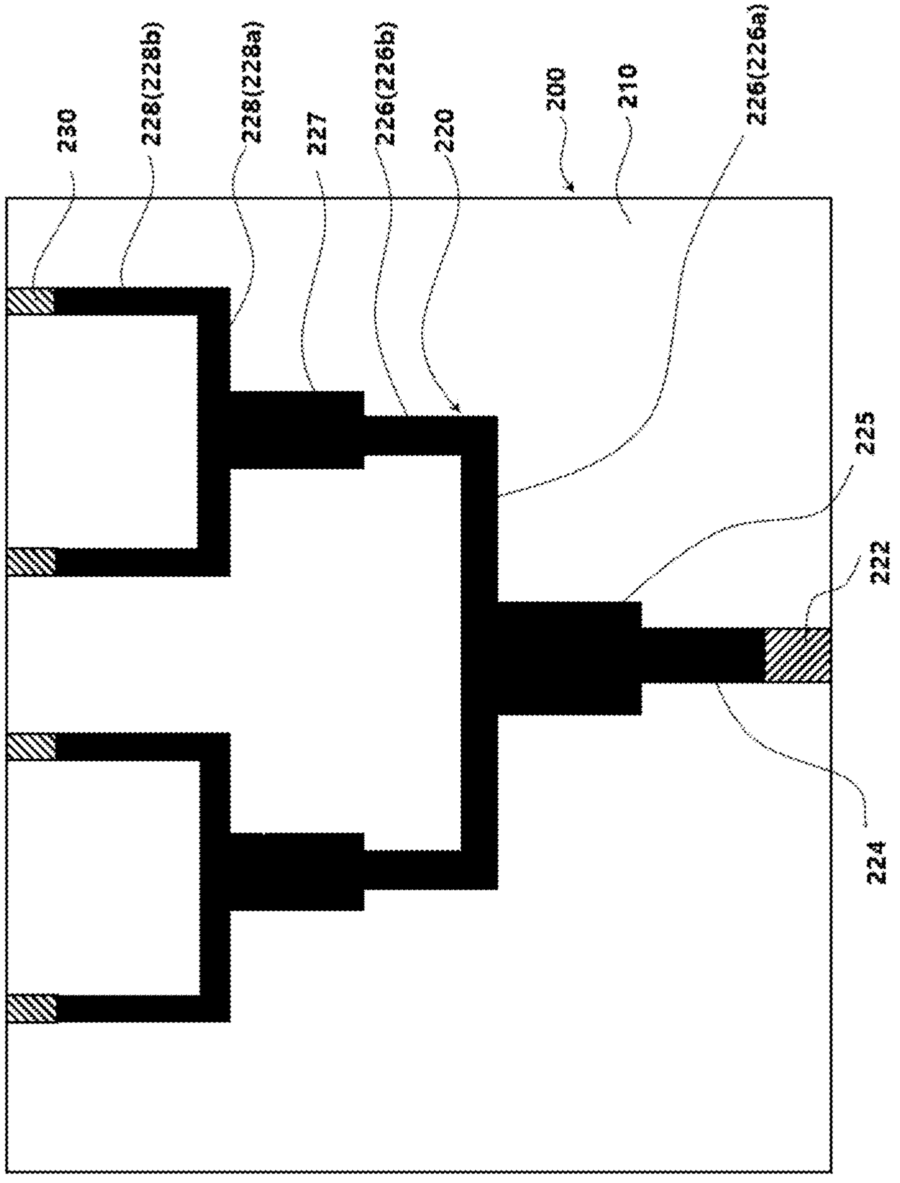
FIGS. 3 and 4 are schematic plan views illustrating intermediate circuit boards of an antenna package in accordance with exemplary embodiments.
Figure 4:
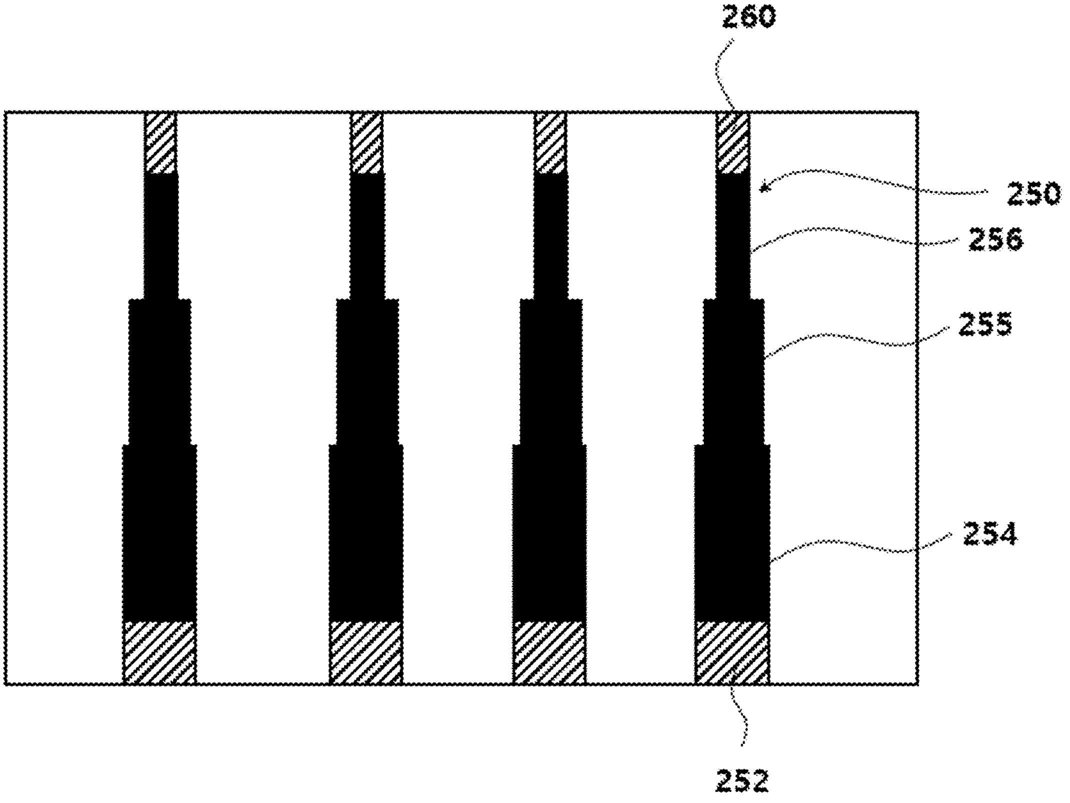

FIGS. 3 and 4 are schematic plan views illustrating intermediate circuit boards of an antenna package in accordance with exemplary embodiments.

Referring to FIG. 3, as described with reference to FIG. 1, the intermediate circuit board 200 may have a passive-type arrangement of the signal lines 220.

As described above, the intermediate circuit board 200 may include the signal line 220 arranged on one surface of the core layer 210.

The signal line 220 may include a first port 222, modulating portions 225 and 227, and a second port 230. The modulating portion 225 and 227 may include a first modulating portion 225 and a second modulating portion 227.

The first port 222 may serve as an input port receiving a power from the antenna driving IC 310. The first port 222 may be disposed to be adjacent to the antenna driving IC 310, and may be directly connected to the antenna driving IC 310. For example, a feeding pad included in the antenna driving IC 310 and the first port 222 may be connected to each other.

The first port 222 may be connected to the first modulating portion 225 through a first wiring portion 224. In exemplary embodiments, a width of the first modulating portion 225 may be greater than that of the first wiring portion 224. An impedance of a feeding signal transmitted through the first port 105 and the first wiring portion 224 may be adjusted by the first modulating portion 225 and transmitted to a second wiring portion 226.

In exemplary embodiments, a width of the first modulating portion 225 may be greater than a width of the second wiring portion 226. In some embodiments, the width of the second wiring portion 226 may be smaller than that of the first wiring portion 224.

In some embodiments, an impedance (a first impedance) of the first port 222 and an impedance (a second impedance) of the second wiring portion 226 may be different from each other, and a conversion of the first impedance to the second impedance may be performed through the first modulating portion 225. In some embodiments, the second impedance may be greater than the first impedance.

In some embodiments, a impedance (a first modulating impedance) of the first modulating portion 225 may be smaller than each of the first impedance and the second impedance.

In exemplary embodiments, the first modulating impedance $T_1$ may be adjusted based on Equation 1 below.

$$T_1 = \sqrt{\frac{Z_2}{2} * Z_1} \quad \text{[Equation 1]}$$

In Equation 1, $Z_1$ and $Z_2$ represent the first impedance and the second impedance, respectively, and $T_1$ represents the first modulating impedance.

In an embodiment, the first modulating impedance may satisfy Equation 1-1 below.

$$\sqrt{\frac{Z_2}{2} * Z_1} - 2\Omega \le T_1 \le \sqrt{\frac{Z_2}{2} * Z_1} + 2\Omega \quad \text{[Equation 1-1]}$$

The widths of the first wiring portion 224, the first modulating portion 225 and the second wiring portion 226 may be adjusted to satisfy Equation 1 or Equation 1-1 above.

In some embodiments, the first port 222 and the first wiring portion 224 may have the same width. For example, the first port 222 and the first wiring portion 224 may be formed as a substantially integral wiring, and the other end portion of the signal line 220 may serve as the first port 222.

In some embodiments, the first port 222 and the first wiring portion 224 may share the first impedance.

In exemplary embodiments, the second wiring portion 226 may have a branched shape extending from the first modulating portion 225. For example, the second wiring portion 226 may include a plurality of branched portions **226*b*, and the branched portions 226*b* may be connected in parallel by a merging portion 226*a***.

The merging portion **226*a* may extend in the width direction, and the branched portions 226*b* extending in a length direction may be connected to each other by the merging portion 226*a*. The first modulating portion 225 may be integrally connected to the merging portion 226*a***.

In exemplary embodiments, the same width (line width) may be maintained throughout the second wiring portion 226, and the merged portion **226*a* and the branched portion 226*b* may have substantially the same width. Additionally, the second impedance may be maintained throughout the second wiring portion 226**.

The second wiring portion 226 may be electrically connected to a third wiring portion 228 through the second modulating portion 227. In exemplary embodiments, a width of the second modulating portion 227 may be greater than that of the second wiring portion 226 and may be greater than that of the third wiring portion 228. In some embodiments, the width of the third wiring portion 228 may be smaller than that of the second wiring portion 226.

In some embodiments, the width of the second modulating portion 227 may be smaller than that of the first modulating portion 225.

An impedance of the third wiring portion 228 may be converted into a third impedance different from the second impedance through the second modulating portion 227. In some embodiments, the third impedance may be greater than the second impedance.

In some embodiments, the third impedance may be determined by Equation 2 below.

$$Z_2=\sqrt{Z_3 * Z_1} \qquad \text{[Equation 2]}$$

In Equation 2, $Z_1$, $Z_2$ and $Z_3$ represent the first impedance, the second impedance and the third impedance, respectively.

In some embodiments, an impedance (a second modulating impedance) of the second modulating portion 227 may be smaller than each of the second impedance and the third impedance. In an embodiment, the second modulating impedance may be greater than the first modulating impedance.

In exemplary embodiments, the second modulating impedance $T_2$ may be adjusted based on Equation 3 below.

$$T_2=\sqrt{\frac{Z_3}{2} * Z_2} \qquad \text{[Equation 3]}$$

In Equation 3, $Z_2$ and $Z_3$ represent the second impedance and the third impedance, respectively, and $T_2$ represents the second modulating impedance.

In an embodiment, the second modulating impedance may satisfy Equation 3-1 below.

$$\sqrt{\frac{Z_3}{2} * Z_2}-2\Omega \leq T_2 \leq \sqrt{\frac{Z_3}{2} * Z_2}+2\Omega \qquad \text{[Equation 3-1]}$$

The second modulating portion 227 may be formed as an integral wiring with each of the branched portions 226*b*. Accordingly, a plurality of the second modulating portions 227 may be included in the signal line 220 to correspond to the number of the branched portions 226*b*. The second modulating portion 227 may be directly connected to the third wiring portion 228.

In exemplary embodiments, the third wiring portion 228 may have a branch shape extending from the second modulating portion 227. For example, the third wiring part 228 may include a plurality of signal output portions 228*b*, and the signal output portions 228*b* may be connected in parallel by a connecting portion 228*a*. The second modulating portion 227 may be directly connected to the connecting portion 228*a*.

In exemplary embodiments, the same width may be maintained throughout the third wiring portion 228, and widths of the connecting portion 228*a* and the signal output portion 228*b* may be substantially the same. The third impedance may be maintained throughout the third wiring portion 228.

As described above, the signal line 220 may include a plurality of the second modulating portions 227. The third wiring portion 228 may be connected to each of the second modulating portions 227.

In exemplary embodiments, a feeding group may be defined by a pair of the signal output portions 228*b* and the connection portion 228*a*, and the third wiring portion 228 may include a plurality of the feeding groups, each of which is connected to each of the second modulating portions 227.

The second port 230 may be provided at each terminal end portion of the signal output portions 228*b*. For example, the second port 230 may be integrally connected to the terminal end portions of each of the signal output portions 228*b*.

In some embodiments, a width of the second port 230 may be the same as that of the third wiring portion 228. For example, the second port 230 and the signal output portion 228*b* may be substantially formed as an integral wiring, and the one end portions of the signal line 220 may each serve as the second port 230.

The second port 230 may be bonded to the signal pad 126 of the antenna unit 120 and may serve as an output port for transmitting power and driving signals to the signal pad 126.

The second port 230 may be electrically connected with the signal pad 126 in a bonding region BR (see FIG. 1). For example, the second port 230 and the signal pad 126 may be bonded to each other by an anisotropic conductive film (ACF).

In the bonding region BR, an insulating structure or a dielectric structure (see FIG. 7) may be disposed above and below the signal pad 126 of the antenna unit 120, and the ACF may be disposed as described above. Accordingly, an impedance of the antenna unit 120 in the bonding region BR may be disturbed or increased.

In exemplary embodiments, the impedance of the second port 230 may be changed in the bonding region BR to correspond to the impedance of the antenna unit 120 by the above-described impedance modulation mechanism in the intermediate circuit board 200 including the modulating portions 225 and 227.

In exemplary embodiments, the impedance of the second port 230 may be greater than that of the first port 222. Accordingly, the first port 222 may be set to the relatively small first impedance to increase efficiency of receiving power from the antenna driving IC 310 and to prevent a power loss. Thereafter, the second port 230 may be set to the relatively increased third impedance through the first and second modulating portions 225 and 227.

Thus, signal loss and antenna gain reduction due to an impedance mismatching in the bonding region BR may be prevented, and loss of the power supplied from the antenna driving IC 310 may be reduced. Additionally, a stepwise impedance conversion may be performed through the modulating portions 225 and 227, so that a signal loss due to the impedance modulation may be prevented.

In some embodiments, a length of each of the modulating portions 225 and 227 may be adjusted to a length corresponding to a quarter wavelength of a wavelength corresponding to a resonance frequency of the antenna unit 120 or the radiator 122.

For example, the length D of each of the modulating portion 225 and 227 may be determined through Equation 4 below.

$$D=\frac{\lambda}{4\sqrt{\varepsilon_r}} \qquad \text{[Equation 4]}$$

In Equation 4, $\lambda$ is a wavelength corresponding to a target frequency of the antenna device or the antenna unit, and $\varepsilon_r$ is a permittivity of the dielectric layer.

Referring to FIG. 4, as described with reference to FIG. 2, the intermediate circuit board 200 may have an active type signal line 250 arrangement.

The signal line 250 may include a first port 252 and a second port 260, and a modulating portion 255 may be disposed between the first port 252 and the second port 260. The first port 252 and the modulating portion 255 may be connected through a first wiring portion 254, and the modulating portion 255 and the second port 260 may be connected through a second wiring portion 256.

Each of the first wiring portion 254 and the second wiring portion 256 may have a non-branched shape extending in a linear single line shape.

The modulating portion 255 may be provided as an integral wiring with each of the wiring portions 254 and 256, and may be directly connected to the wiring portions 254 and 256.

In exemplary embodiments, a width of the modulating portion 255 may be smaller than that of the first wiring portion 254 and may be larger than that of the second wiring portion 256. For example, the widths of the first wiring portion 254, the modulating portion 255 and the second wiring portion 256 may be sequentially reduced.

The first port 252 may have a first impedance. The first port 252 and the first wiring portion 254 may share the first impedance, and may be integral wirings having substantially the same width.

An impedance increased from the first impedance may be transmitted to the second wiring portion 256 and the second port 260 by the modulating portion 255. The first impedance may be converted into a modulating impedance that is greater than the first impedance by the modulating portion 255, and the modulating impedance may be increased by the second wiring portion 256.

Accordingly, the second wiring portion 256 may have a second impedance greater than the modulating impedance and the first impedance. The second port 260 and the second wiring portion 256 may be integral wirings that may share the second impedance and have substantially the same width.

For example, the modulating impedance T may be adjusted based on Equation 5 below.

$$T=\sqrt{Z_1*Z_2} \quad \text{[Equation 5]}$$

In Equation 5, $Z_1$ and $Z_2$ represent the first impedance and the second impedance, respectively.

In an embodiment, the modulating impedance may satisfy Equation 5-1 below.

$$\sqrt{Z_1*Z_2}-2\Omega \leq T \leq \sqrt{Z_1*Z_2}+2\Omega \quad \text{[Equation 5-1]}$$

As illustrated in FIG. 4, the intermediate circuit board 200 may include a plurality of the signal lines 250, each of which includes a structure of the first port 252—the the first wiring portion 254—the modulating portion 255—the second wiring portion 256—the second port 260. The plurality of the signal lines 250 may be arranged to be physically and electrically independent from each other.

Each signal line 250 may be electrically connected to the antenna unit 120, and a power can be supplied individually and independently through the signal pad 126 of the antenna unit 120. As described above, the second port 260 may be bonded to the signal pad 126 in the bonding region BR, and may have the second impedance greater than the first impedance of the first port 252. Thus, a signal loss in the antenna unit 120 may be suppressed, and an antenna gain may be increased by the impedance matching in the bonding region BR.

As described above, a length of the modulating portion 255 may be adjusted to a length corresponding to a quarter wavelength of a wavelength corresponding to the resonance frequency of the antenna unit 120 or the radiator 122, and may be determined through the above Equation 4 above.

As illustrated in FIG. 2, the signal line 250 may have a bent line shape. For example, a bent portion of the signal line 250 (indicated by a dotted line ellipse in FIG. 2) may be included in the modulating portion 255. The bent portion may be included as the second wiring portion 256.

Figure 5:
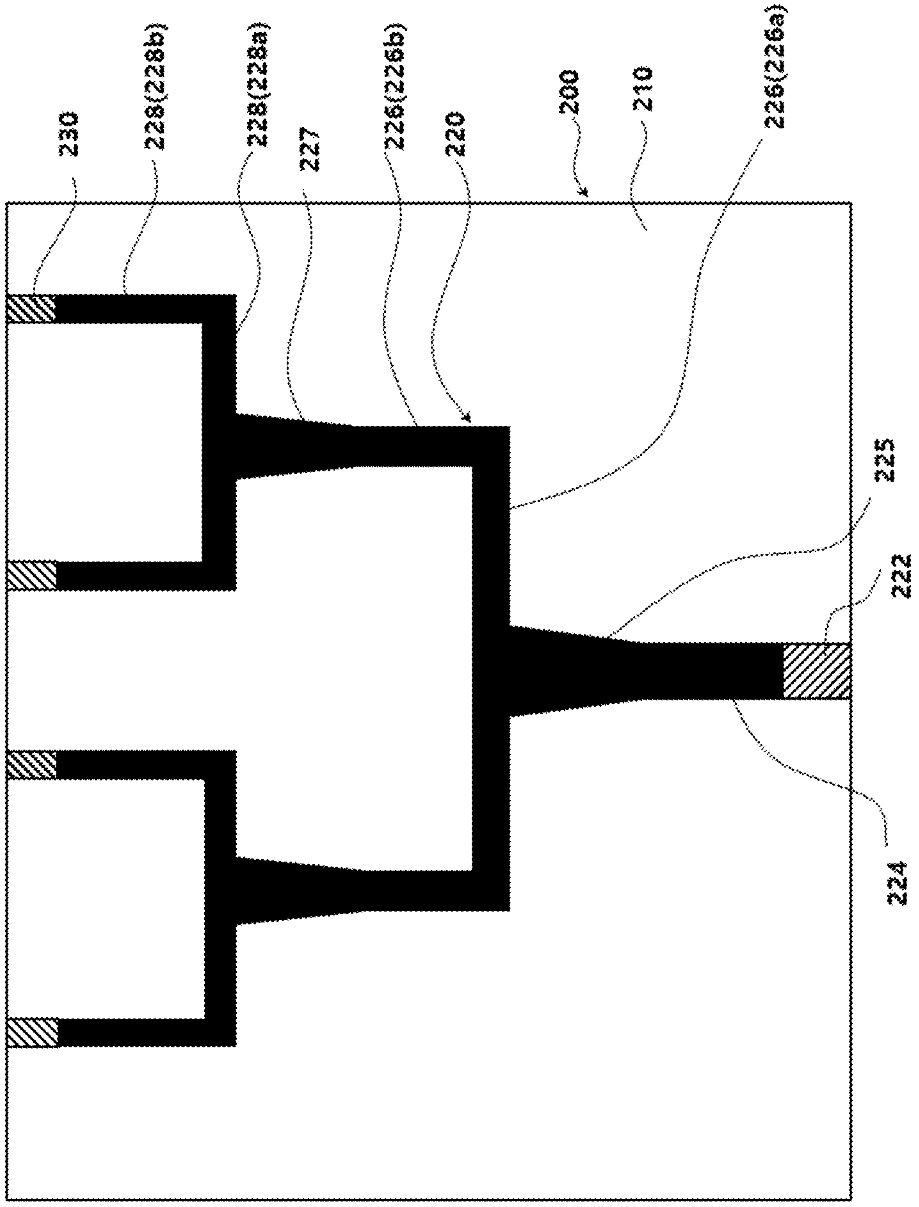
FIGS. 5 and 6 are schematic plan views illustrating intermediate circuit boards of an antenna package in accordance with some exemplary embodiments.
Figure 6:
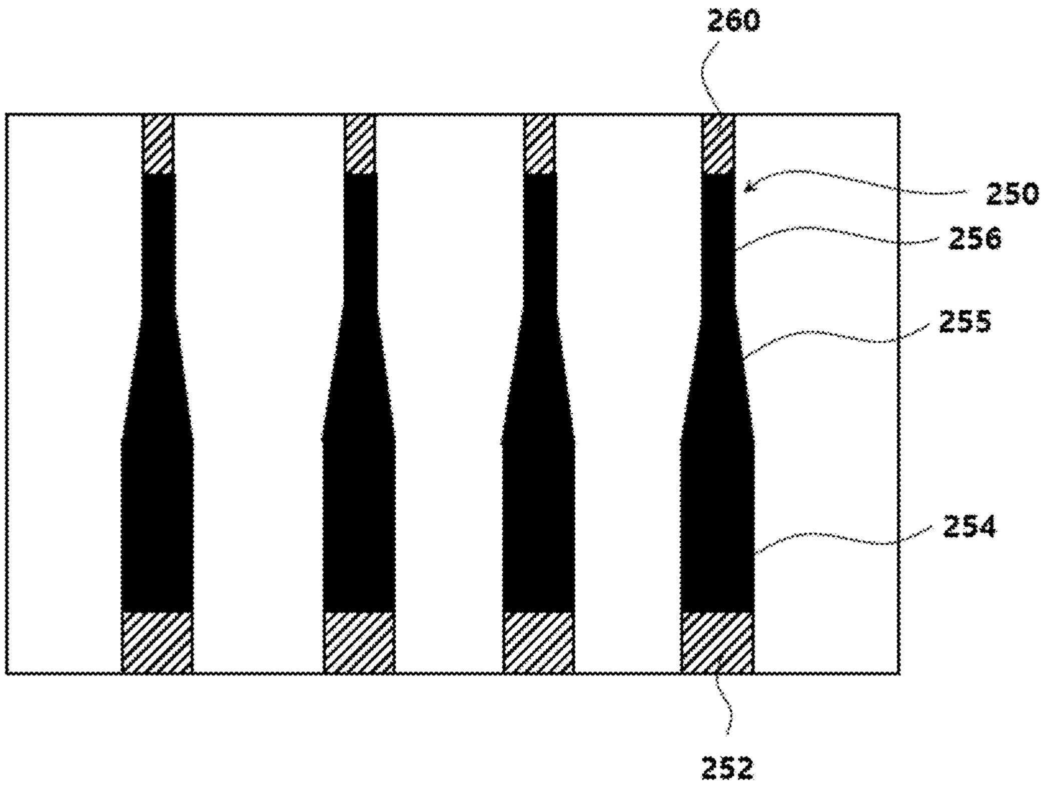

FIGS. 5 and 6 are schematic plan views illustrating intermediate circuit boards of an antenna package in accordance with some exemplary embodiments. Detailed descriptions on elements and structures substantially the same as or similar to those described with reference to FIGS. 3 and 4 are omitted herein.

Referring to FIG. 5, the signal line 220 of the intermediate circuit board 200 may have a passive type structure as described with reference to FIGS. 1 and 3.

The modulating portions 225 and 227 may each have a rectangular bar shape as shown in FIG. 3. As illustrated in FIG. 5, the modulating portions 225 and 227 may have a shape in which a width gradually increases in a direction from the first port 222 to the third port 230. For example, the modulating portions 225 and 227 may have an inverted trapezoidal shape.

Referring to FIG. 6, the signal line 250 of the intermediate circuit board 200 may have an active type structure as described with reference to FIGS. 2 and 4.

As illustrated in FIG. 4, the modulating portion 255 may have a rectangular bar shape. In this case, the signal line 250 may have a stepped shape so that a width decreases in a direction from the first port 252 to the second port 260.

As illustrated in FIG. 6, the modulating portion 255 may have a shape in which a width gradually decreases in a direction from the first port 252 to the second port 260. For example, the modulating portion 255 may have a trapezoidal shape.

Figure 7:
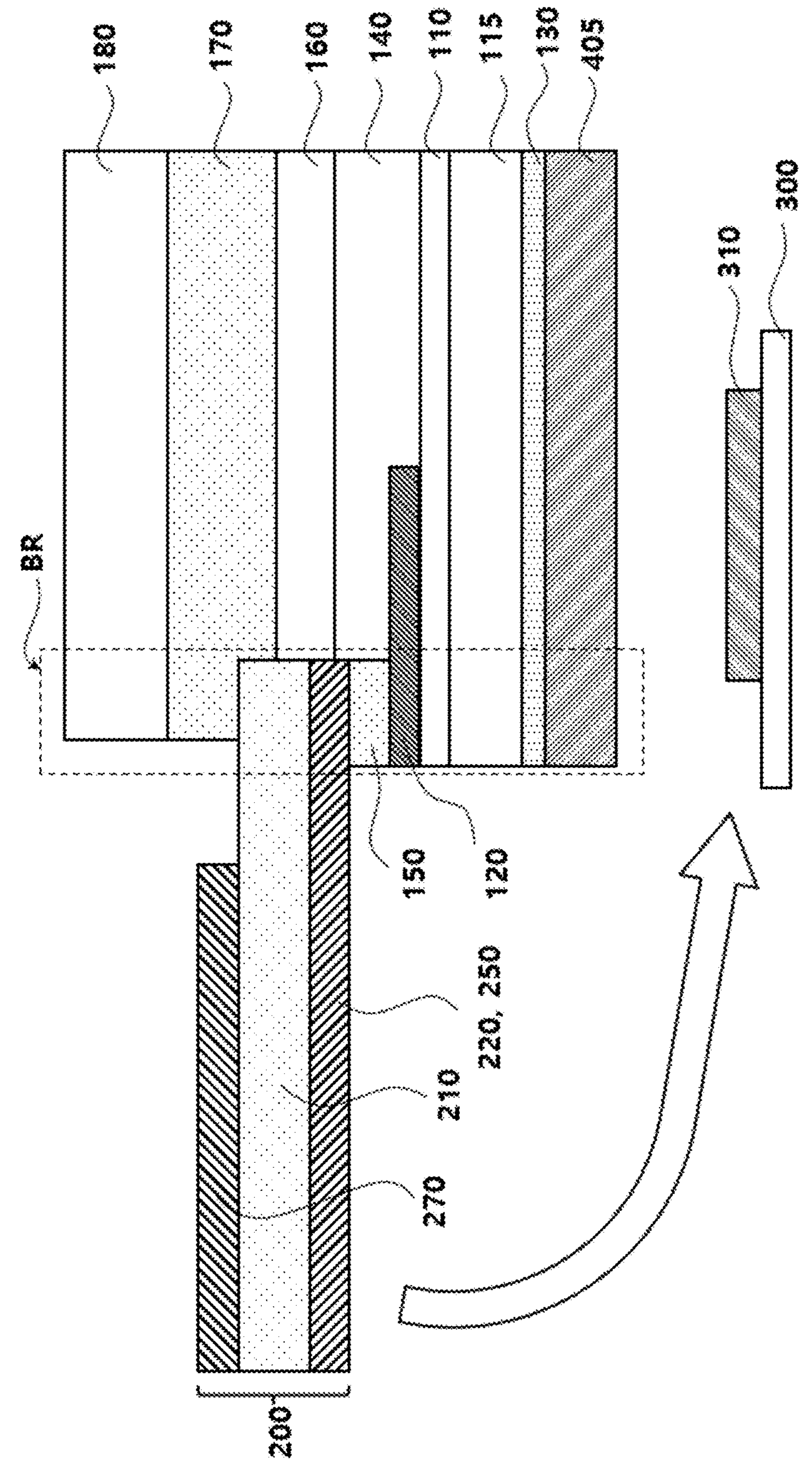
FIGS. 7 and 8 are a schematic cross-sectional view and a schematic top plan view, respectively, illustrating an image display device in accordance with exemplary embodiments.
Figure 8:
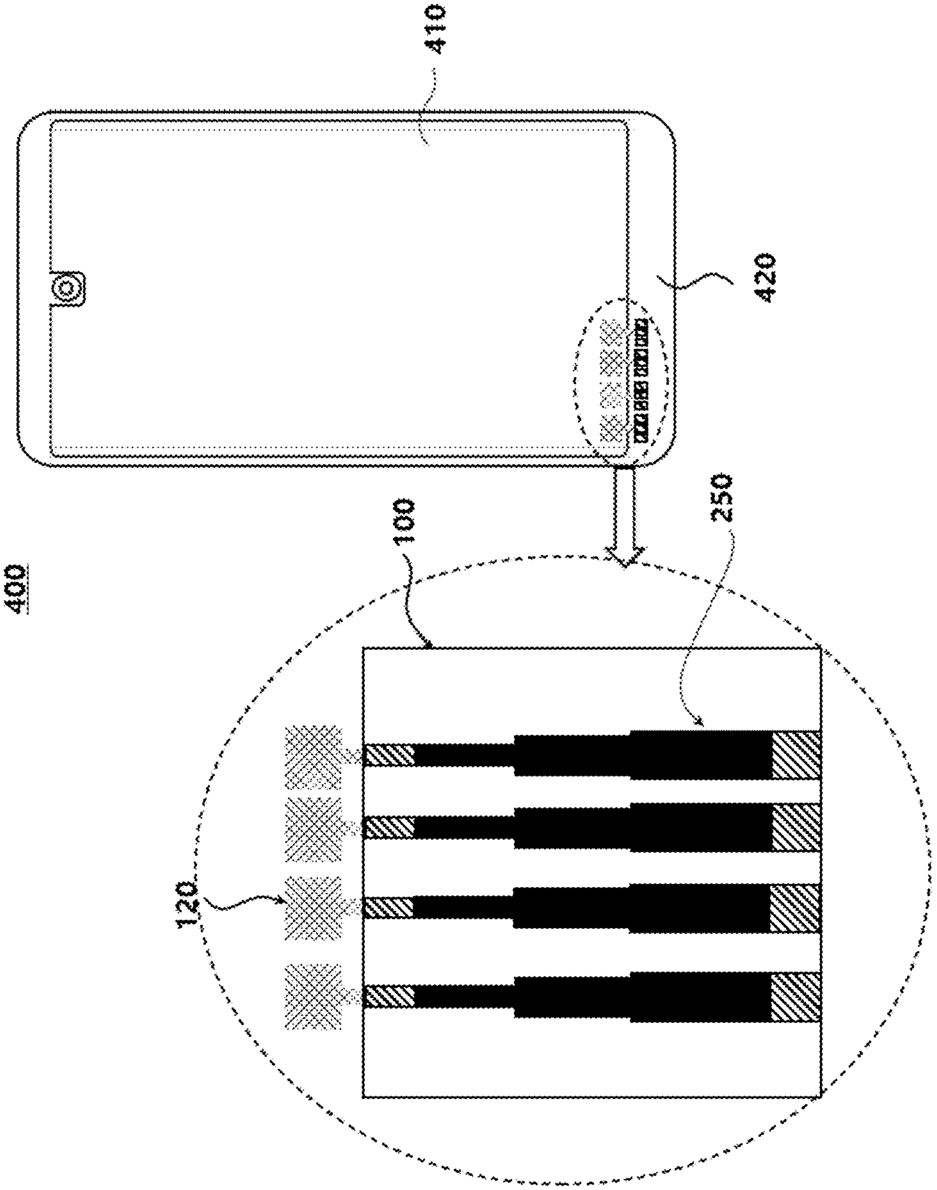

FIGS. 7 and 8 are a schematic cross-sectional view and a schematic top plan view, respectively, illustrating an image display device in accordance with exemplary embodiments.

Referring to FIGS. 7 and 8, an image display device 400 may be implemented in the form of, e.g., a smart phone, and FIG. 8 illustrates a front portion or window surface of the image display device 400. The front portion of the image display device 400 may include a display area 410 and a peripheral area 420. The peripheral area 420 may correspond to, e.g., a light-shielding portion or a bezel portion of the image display device.

The antenna device 100 or the antenna unit 120 included in the above-described antenna package may be disposed toward the front portion of the image display device 400, and may be disposed, e.g., on the display panel 405. The radiator 122 may overlap the display area 410.

In this case, the radiator 122 may include a mesh structure, and a reduction of transmittance due to the radiator 122 may be prevented. The pads 126 and 128 of the antenna unit 120 include a solid metal pattern and may be disposed in the peripheral area 420 to prevent degradation of an image quality.

As illustrated in FIG. 7, the intermediate circuit board 200 may be bent and may extend toward the chip mounting board 300 on which the antenna driving IC chip 310 is mounted at a rear portion of the image display device 400.

In some embodiments, the intermediate circuit board 200 and the chip mounting board 300 may be coupled to each other by a connector (not illustrated) to form the antenna package.

In some embodiments, the intermediate circuit board 200 may further include a ground layer 270. The ground layer 270 may formed on the other surface of the core layer 210 and may overlap the signal line 220 in a thickness direction. Accordingly, a feeding efficiency may be improved by an electric field generated between the signal line 220 and the ground layer 270.

A passivation layer 140 protecting the antenna unit 120 may be formed on a top surface of the antenna dielectric layer 110. A lower insulating layer 115 may be stacked on a bottom surface of the antenna dielectric layer 110, and an upper insulating layer 160 may be stacked on the passivation layer 140.

In some embodiments, any one of the lower insulating layer 115 and the upper insulating layer 160 may include a polarizer or a polarizing plate.

A cover window 180 may be disposed at an outermost surface of the image display device 400. In some embodiments, the cover window 180 may be stacked on the upper insulating layer 160 by an adhesive layer 170. The cover window 180 may include a glass substrate such as a flexible polymer or an ultra-thin glass (UTG).

In some embodiments, an adhesive layer for combining the antenna device 100 onto the display panel 405 may be added. The antenna ground layer 130 may be formed on a bottom surface of the lower insulating layer 115. As described above, the antenna ground layer 130 may be included as an element of the display panel 405.

As described with reference to FIG. 7, the conductive bonding structure 150 and insulating structures are included in the bonding region BR of the antenna device 100 and the intermediate circuit board 200. Accordingly, an impedance according to a target frequency set in the antenna device 100 may be fluctuated or disturbed, and an impedance mismatching with the signal line of the intermediate circuit board 200 may be caused.

However, according to exemplary embodiments as described above, the impedance in the bonding region BR may be increased by the signal lines 220 and 250 having a variable width structure using the modulating portion. Accordingly, the impedance mismatching in the bonding area BR may be reduced or buffered to increase feeding/driving signal transfer efficiency to the radiator 122, thereby improving antenna properties.

In FIG. 8, the active-type intermediate circuit board described with reference to FIG. 4 is illustrated. However, the passive-type intermediate circuit board described with reference to FIG. 3 may be included in the antenna package or the image display device.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLE

An intermediate circuit board of Example having line width/impedance shown in Table 1 below, and including a cooper signal line with the structure/shape shown in FIG. 3 and a polyimide core layer ($\varepsilon_r$: 3) was fabricated.

TABLE 1

| | line width (mm) | impedance (Ω) |
|---|---|---|
| first port 222 | 0.115 | 50 |
| first wiring portion 224 | 0.115 | 50 |
| first modulating portion 225 | 0.185 | 36.74 |
| second wiring portion 226 | 0.100 | 54 |
| second modulating portion 227 | 0.160 | 40.25 |
| third wiring portion 228 | 0.080 | 60 |
| second port 230 | 0.080 | 60 |

Lengths of the first modulating portion 225 and the second modulating portion 227 were adjusted to 1.2 mm (λ: wavelength corresponding to 38 GHz) according to Equation 4.

Comparative Example

An intermediate circuit board was fabricated to have the same structure as that in Example, except that an overall width of the signal lines was formed to be 0.115 mm and the impedance was entirely set to 50Ω.

Experimental Example

The intermediate circuit boards according to Example and Comparative Example were each bonded to the same antenna units of the structure shown in FIG. 1, respectively.

Thereafter, while supplying a power through the first port 222, a signal loss (Return Loss; S11) according to frequency was simulated using HFSS, and an antenna gain value according to the frequency was extracted in a radiation chamber.

Figure 9:
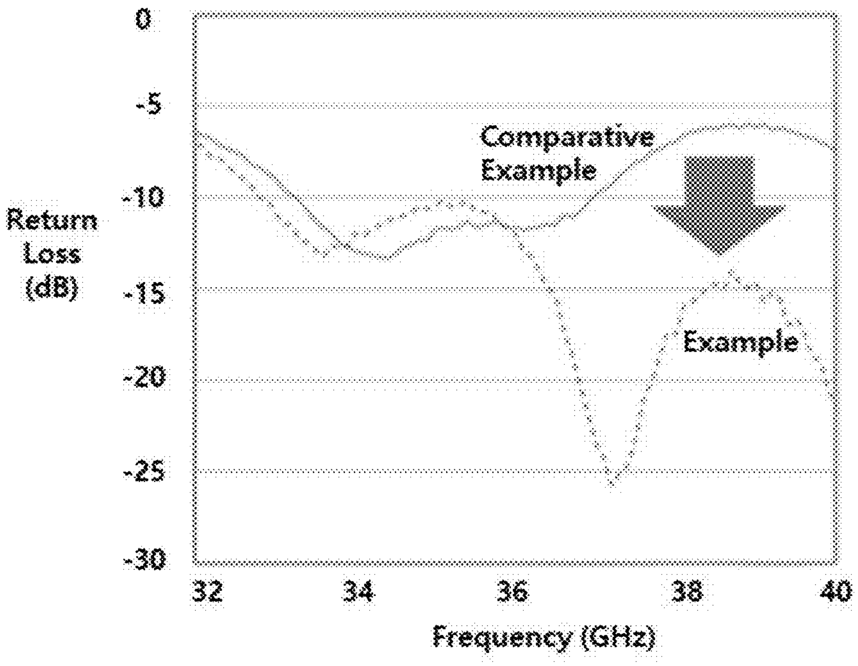
FIGS. 9 and 10 are graphs showing changes of a signal loss and an antenna gain based on a frequency simulated using an intermediate circuit board according to Example and Comparative Example, respectively.
Figure 10:
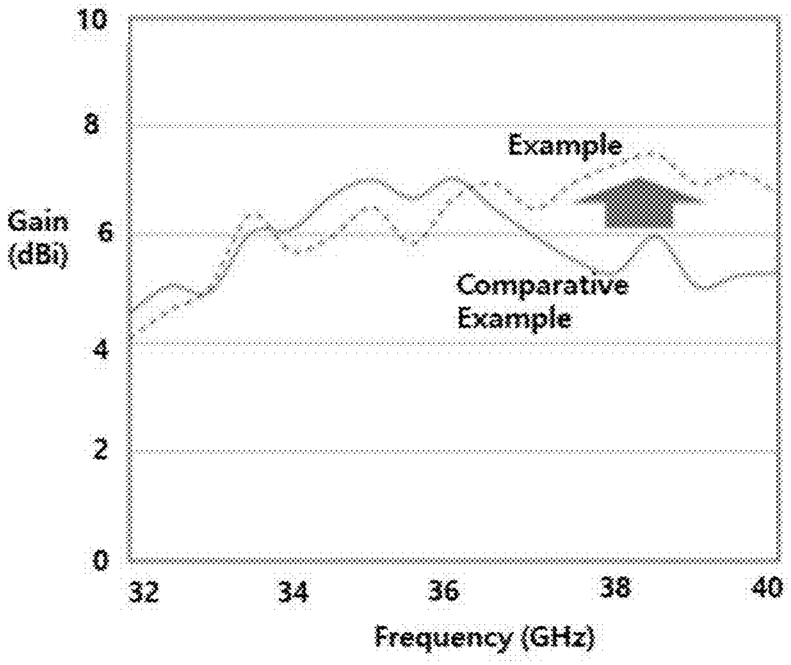

FIGS. 9 and 10 are graphs showing changes of a signal loss and an antenna gain based on a frequency simulated using an intermediate circuit board according to Example and Comparative Example, respectively.

Referring to FIGS. 9 and 10, as indicated by arrows, in Example where the intermediate circuit board having the variable width was used, the signal loss was explicitly reduced in a high frequency band ranging from 36 GHz or more or from 36 GHz to 40 GHz, and the antenna gain was increased.

What is claimed is:

1. An antenna package comprising:

an antenna device comprising an antenna dielectric layer and an antenna unit formed on the antenna dielectric layer; and an intermediate circuit board electrically connected to the antenna unit, the intermediate circuit board comprising:

a core layer; and a signal line formed on a surface of the core layer and electrically connected to the antenna unit, wherein a width of one end portion of the signal line connected to the antenna unit is smaller than a width of the other end portion opposite to the one end portion of the signal line, and the signal line comprises:

a first port formed at the other end portion;

a second port formed at the one end portion; and a modulating portion interposed between the first port and the second port, the modulating portion having a width different from each width of the first port and the second port.

2. The antenna package of claim 1, wherein the modulating portion comprises a first modulating portion and a second modulating portion, wherein the signal line further comprises:

a first wiring portion connecting the first port and the first modulating portion;

a second wiring portion connecting the first modulating portion and the second modulating portion and including branched portion; and a third wiring portion connecting the second modulating portion and the second port and including signal output portions.

3. The antenna package of claim 2, wherein the second modulating portion is connected to each of the branched portions, and a plurality of the signal output portions are branched from the second modulating portion.

4. The antenna package of claim 3, wherein the second port comprises a plurality of second ports connected to each of terminal ends of the signal output portions.

5. The antenna package of claim 2, wherein a width of the second wiring portion is smaller than a width of the first wiring portion, and a width of the third wiring portion is smaller than the width of the second wiring portion.

6. The antenna package of claim 5, wherein a width of the second modulating portion is greater than each width of the first wiring portion, the second wiring portion and the third wiring portion, and a width of the first modulating portion is greater than the width of the second modulating portion.

7. The antenna package of claim 1, wherein the signal line further comprises:

a first wiring portion connecting the first port and the modulating portion and having a single line shape; and a second wiring portion connecting the modulating portion and the second port and having a single line shape.

8. The antenna package of claim 7, wherein widths of the first wiring portion, the modulating portion and the second wiring portion sequentially decrease.

9. The antenna package of claim 8, wherein the first port and the first wiring portion have the same width, and the second port and the second wiring portion have the same width.

10. The antenna package of claim 1, wherein an impedance of the second port is greater than an impedance of the first port.

11. The antenna package of claim 10, wherein an impedance of the modulating portion is different from an impedance of the first port and an impedance of the second port.

12. The antenna package of claim 1, further comprising an antenna driving integrated circuit chip connected to the first port.

13. The antenna package of claim 1, wherein the antenna unit comprises a radiator, a transmission line extending from the radiator, and a signal pad formed at an end portion of the transmission line, and the antenna package further comprises a conductive bonding structure bonding the signal pad and the second port of the intermediate circuit board.

14. The antenna package of claim 1, wherein the antenna device is an antenna-on display (AOD) device.

15. An image display device, comprising:

a display panel including a display area and a peripheral area; and the antenna package according to claim 1 disposed on the display panel.

16. The image display device of claim 15, further comprising a chip mounting board disposed under the display panel, wherein the antenna unit of the antenna package is disposed at least partially within the display area at a front portion of the image display device, and the intermediate circuit board of the antenna package is bent to a rear portion of the image display device and connected to the chip mounting board.

* * * * *